United States Patent

Becker et al.

[11] Patent Number: 5,992,913
[45] Date of Patent: Nov. 30, 1999

[54] RUNNING WHEEL FOR TRAVELING UNITS WHICH ARE MOVABLE ON RAILS, ESPECIALLY FOR TRAVELING CRANES

[75] Inventors: Eberhard Becker, Hagen; Andreas Duhme, Witten; Udo Gersemsky, Herdecke; Winfried Gievers, Wetter; Ingo Grassmann, Wetter; Frank Hildebrandt, Wetter; Klaus-Peter Hoffmann, Schwerte; Gregor Jansen, Bottrop; Karl Knaack, Dortmund; Hans-Hermann Osthoff, Wetter; Thomas Schweflinghaus, Wuppertal; Roland Staggl, Wetter; Manfred Stöber, Witten, all of Germany

[73] Assignee: Mannesmann Aktiengesellschaft, Düsseldorf, Germany

[21] Appl. No.: 08/955,657

[22] Filed: Oct. 22, 1997

[30] Foreign Application Priority Data

Oct. 22, 1996 [DE] Germany .......................... 196 45 147

[51] Int. Cl.⁶ ...................................... B60B 27/06
[52] U.S. Cl. ........................... 295/21; 295/11; 301/105.1
[58] Field of Search ................................ 295/1, 8, 11, 14, 295/21, 30, 31.1, 43, 36.1; 301/64.7, 65, 105.1

[56] References Cited

U.S. PATENT DOCUMENTS 1,122,620  12/1914  Madden ................................ 295/21 X
1,420,389   6/1922  Scott ................................... 295/31.1 X
1,648,413  11/1927  Maas .................................... 295/21 X
3,251,624   5/1966  Mede et al. .............................. 295/11
4,010,972   3/1977  Schindehutte et al. .................... 295/11
4,330,914   5/1982  Hood ................................. 301/64.7 X
5,820,224  10/1998  Dimatteo, Jr. ..................... 301/105.1 X

FOREIGN PATENT DOCUMENTS 20 34 107   1/1972  Germany .
83 13 096   9/1983  Germany .
35 44 952   9/1986  Germany .
40 21 054   9/1992  Germany .
44 13 308   5/1995  Germany .
 2104857    3/1983  United Kingdom ...................... 295/1

OTHER PUBLICATIONS

An article from "Elektrische Bahnen", Jul. 1994, p. 216.

Primary Examiner—Russell D. Stormer
Attorney, Agent, or Firm—Cohen, Pontani, Lieberman & Pavane

[57] ABSTRACT

The invention is directed to a running wheel for traveling units which are movable on rails, especially for traveling cranes. The running wheel includes an outer running ring, a resilient damping hub inserted in central opening of the running ring. The hub transmits torque received from a drive shaft to the running ring. The resilient damping hub effectively intercepts occurring torque peaks forward of the gear unit and drive shaft, by elastically deforming while maintaining a connection at the central opening of the running ring without play.

13 Claims, 6 Drawing Sheets

10
RUNNING WHEEL FOR TRAVELING UNITS WHICH ARE MOVABLE ON RAILS, ESPECIALLY FOR TRAVELING CRANES

BACKGROUND OF THE INVENTION

1. Field of the Invention

The present invention relates to a running wheel for traveling units which are movable on rails, especially for traveling cranes. More specifically, the present invention relates to a running wheel in which destructive torque peaks are effectively damped by a resilient hub positioned between the drive shaft and the running rim, said running rim contacting the rail on which the running wheels roll.

2. Description of the Related Art

The German Utility Model DE 83 13 096 U1 discloses a driven running wheel for a vehicle which is movable on rails, especially for a crane, which has a running ring (roller lining) and an internally-toothed wheel hub being shrunk within a central opening of the running ring. The internal toothing of the wheel hub is arranged symmetrically to a vertical center plane of the running wheel. The running wheel is supported via roller bearings on the tubular axle of the running wheel. The axle is in turn connected with a supporting structure of the running wheel so that it is fixed with respect to rotation relative to it. A drive shaft of a transmission or gear unit projects into the hub and is in a frictional engagement for transmitting torque. For this purpose, the connection between the drive shaft and the hub is effected via a plurality of cooperating toothed wheels which form a planetary gear set arranged within the hub.

A disadvantage in this prior art running wheel is that torque peaks, such as those occurring when the direction of the running wheel is changed, are directly applied to the gear unit, which results, at best, in a reduced life of the gear unit. At worst, in the event of extreme overloading, the gear unit is destroyed. A further disadvantage of this prior art running wheel is that the hub of this running wheel is complicated and therefore difficult to manufacture.

To prevent bending moments and transverse forces from being transmitted to a drive shaft, it is known, for example, from German reference DE 40 21 054 C2, to arrange a resilient element between a gear unit and a connection steel plate (housing), forward of the gear unit, in a torque converter bearing not of the generic type. For this purpose, the resilient element is constructed as an outer ring with internal toothing which is produced from plastic that is deformable under tension.

Another prior art crane running wheel is known from German reference DE-OS 2 034 107. This prior art crane running wheel is formed entirely from plastic and an internal toothing of this prior art running wheel engages the toothing of a drive shaft. Such prior art crane running wheels can only be used with relatively small carried loads, since plastic does not have the strength of steel or cast iron.

SUMMARY OF THE INVENTION

It is an object of the present invention to provide a running wheel for units which are movable on rails, especially for traveling cranes, which, on the one hand, can be heavily loaded and, on the other hand, effectively intercepts torque peaks forward of the gear unit and drive shaft.

The present invention includes a hub constructed of a material such that a torque-transmitting connection without play is formed between a wear-resistant running ring and a resilient damping hub.

The hub is advantageously constructed of a material such that the running ring and the drive shaft are rotatable relative to one another in the manner of a torque rod within a defined angular area when acted upon by torque. The hub of the invention also has, moreover, a high damping rate which effectively reduces torque peaks.

Important to the invention is that the material of the hub is resilient such a that a resilient rotation is realized between the running ring and drive shaft, in the manner of a torque rod, when torque peaks occur. With a resilient hub, the rotation occurs only within a limited angular area, in contrast to a slip clutch in which the amount of rotation is unlimited when a torque peak is exceeded. When the running ring rotates relative to the drive shaft to the maximum amount of angular rotation, that is, in excess of a threshold angle depending on the material and on the construction, the hub acts as a rigid connection between the running ring and the drive shaft. During normal operation and loading, the running wheel is operated such that the maximum angular area of rotation is not exceeded.

The hub of such a running wheel is easy to manufacture so that a large quantity of running wheels can be realized in a building block system in an economical manner.

The connection between the running ring and the hub is stable because the connection is formed by a positive engagement and/or a frictional engagement between the running wheel and the hub.

According to the invention, the rotatability of the running ring relative to the drive shaft is realized in the manner of a torque rod in that the hub is formed with respect to material at least partially from a resilient plastic. The resilient plastic provides for the resilient rotatability of the running ring with respect to the drive shaft within a defined range.

In a production of the device of the present invention, the plastic hub can be cast by injection molding. Accordingly, the hub having resilient characteristics is easy to manufacture, so that different running rings can be provided with suitably constructed hubs to adapt to a very wide range of loads and requirements economically without the need to store this large number of different hubs.

In another embodiment, the hub is formed at least partially of a resilient light metal alloy.

In yet another embodiment, the construction of the invention provides that the outer rim region of the hub is formed of plastic. In this embodiment, the hub includes, for example, a plastic outer ring whose thickness can be reduced or increased as required depending on the desired resilient buffer effect. The inner rim area can then be adapted specifically to other requirements with regard to other characteristics, such as, for example, strength for accepting a required torque.

In yet another embodiment, the outer rim area of the hub comprises at least one third of the hub diameter, since, in general, the elasticity of the hub would otherwise not be sufficient.

To ensure a tight fit and adequate torque transmission between the running ring and the hub such that the running ring and hub are especially free from play, the opening of the running ring has an equilateral spherical triangle in cross section. The hub which is constructed with a shaft having a corresponding cross section is inserted therein. In addition to providing adequate torque transmission, a cross section of this kind is relatively easy to manufacture.

The hub includes a centrally arranged through-opening, in which a correspondingly shaped shaft end of the drive shaft is insertable in a positive engagement and/or in a frictional engagement such that there is no play between the two parts.

Favorable torque transmission characteristics are achieved when the through-opening has an equilateral spherical triangle cross section or a spline toothing cross section. This embodiment is also relatively easy to manufacture.

In an embodiment in which the running wheels moves very heavy loads, the running ring is produced from wear-resistant cast iron or from steel.

In a further embodiment, a metal ring is inserted into the through-opening of the hub for managing very high torques.

For a simple manufacture of the equilateral spherical triangle as a cross-sectional inner surface of the running ring, it is suggested that the outside of both sides of the running ring include three recesses arranged at equal angular distances from one another. These recesses enable a simple monitoring of running ring wear.

Other objects and features of the present invention will become apparent from the following detailed description considered in conjunction with the accompanying drawings. It is to be understood, however, that the drawings are intended solely for purposes of illustration and not as a definition of the limits of the invention, for which reference should be made to the appended claims.

BRIEF DESCRIPTION OF THE DRAWINGS

In the drawings, wherein like reference numerals denote similar elements throughout the several views.

DETAILED DESCRIPTION OF THE PRESENTLY PREFERRED EMBODIMENTS

Figure 1:
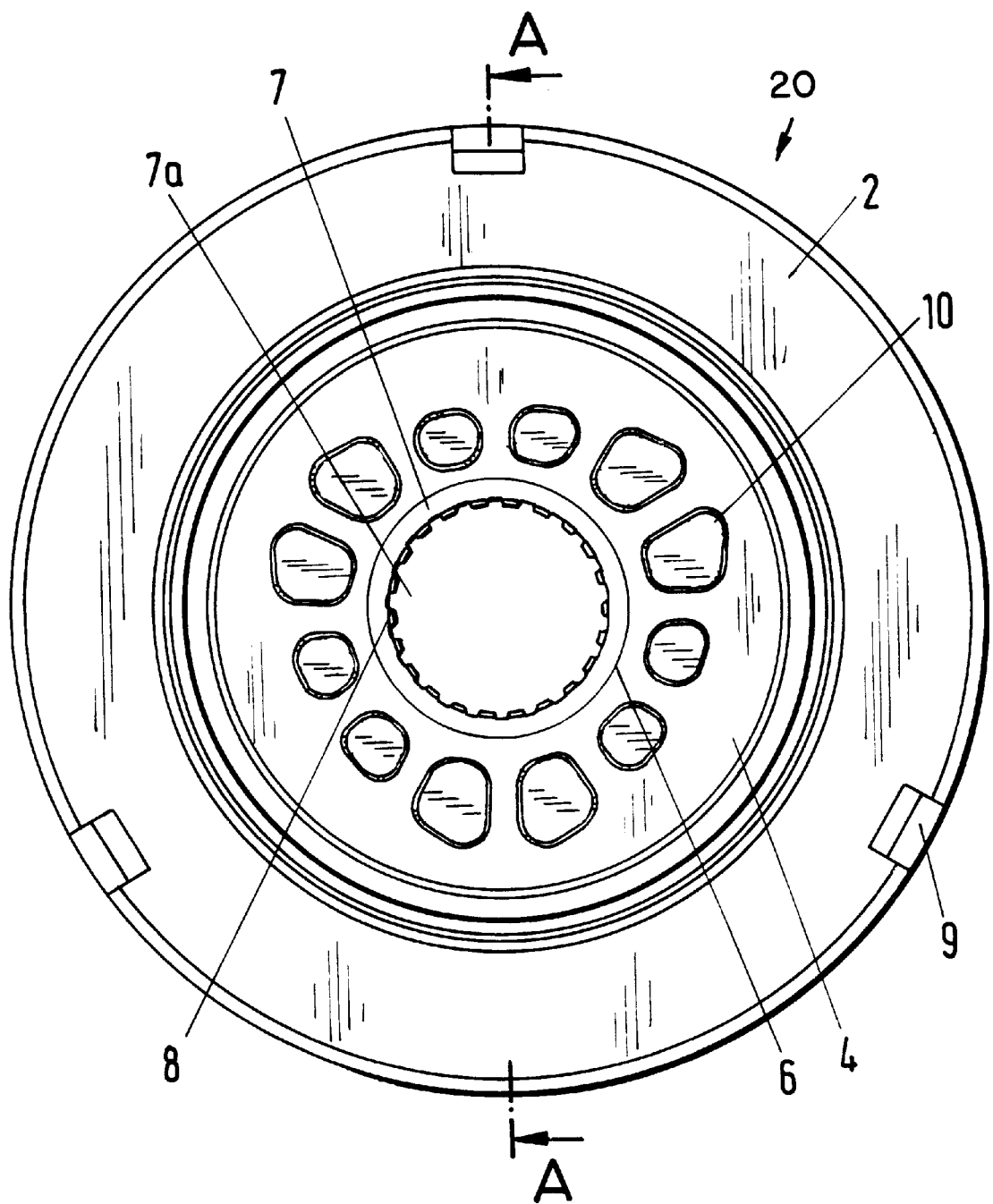
FIG. 1 is a side view of an embodiment of a running wheel of the present invention.

FIG. 1 shows a running wheel 11 for a traveling crane which is movable on a rail and whose axle is supported, for example, via roller bearings, in a housing of a running wheel. The housing is also known as a running wheel block (the running wheel block, the rail, and the axle are not shown in the drawings).

Figure 2:
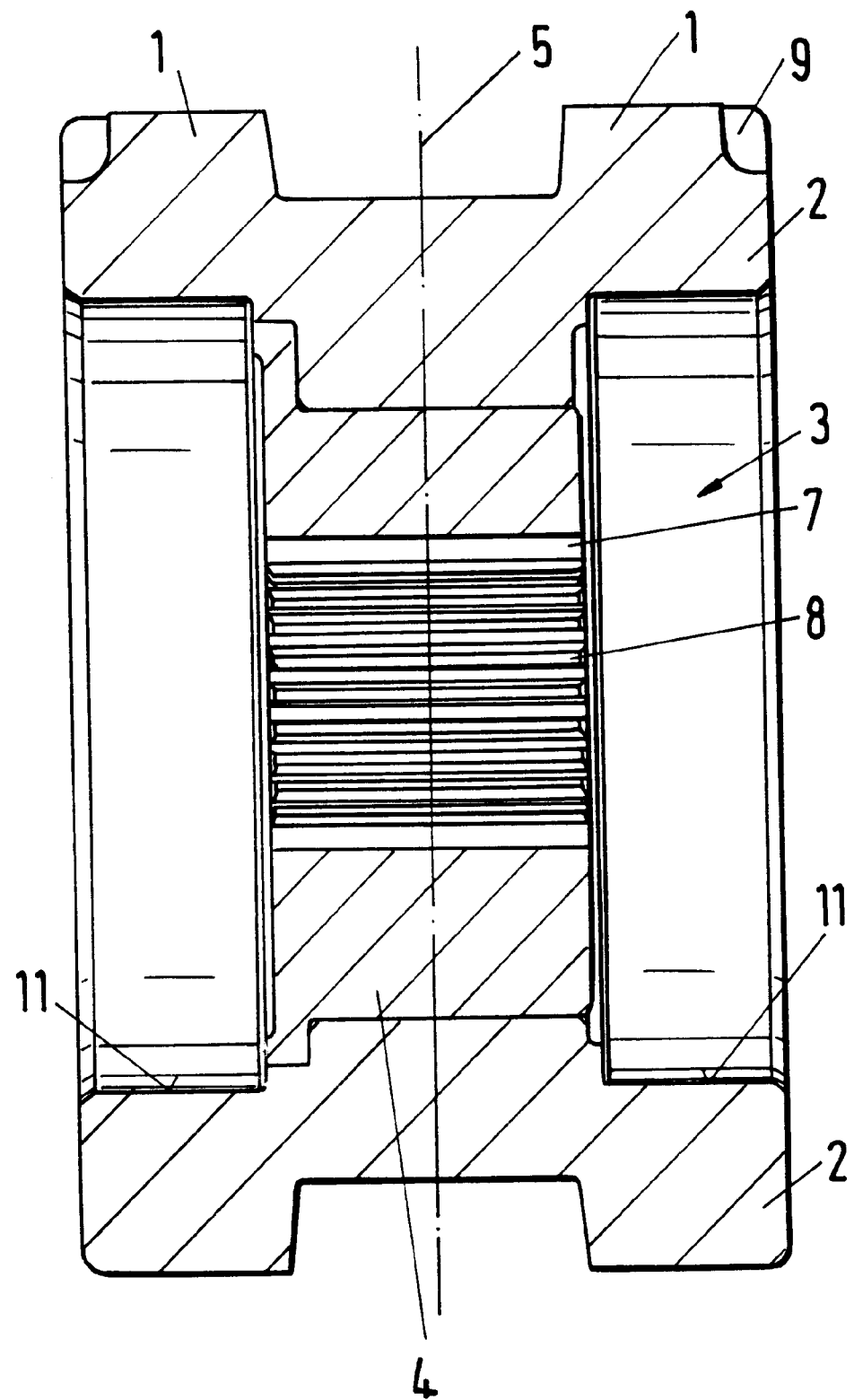
FIG. 2 is a cross section view of the running wheel of FIG. 1 according to section line A—A in FIG. 1.

Referring also to FIG. 2, the running wheel 11 includes a running ring 2 which carries two rims or wheel flanges 1. The running ring 2 has a central opening 3. A hub 4 is inserted in a positive engagement with running ring 2 in the central opening 3 of the running ring 2. The hub 4 is positioned substantially central to a vertical center plane 5 of the running ring 2. The width $W_H$ of the hub 4 is approximately equal to half of the width $W_R$ of the running ring 2 as shown in FIG. 2. The running ring 2 is produced from wear-resistant cast iron or steel, so that it has a high resistance to wear and supports high mechanical loading.

The hub 4 is constructed in two parts, namely, a plastic body 21 with a centrally arranged through-opening 6 and a metal ring 7 inserted in the through-opening 6. The metal ring 7 includes an internal toothing 8. A shaft end of a drive shaft (not shown in the drawings) fits in a positive engagement and/or in a frictional engagement, such as a press fit, into an opening 7a of the metal ring 7 without play. This shaft end has an external toothing corresponding the internal toothing 8.

Except for the metal ring 7, the hub 4 is produced from a resilient plastic by injection molding. Of course, it is also possible to produce the hub 4 entirely from plastic. However, it is important that at least the outer rim area of the hub 4 comprises resilient plastic. In a preferred embodiment, one third of the hub diameter is formed of plastic.

Because resilient plastic is used, the hub 4, constructed in this way and which transmits the torque of a drive shaft, ensures that the running ring 2 and the drive shaft are rotatable relative to one another, analogous to a torque bar, inside a limited angular area. A prior art device for reducing the effects of torque peaks includes overload clutches which freely rotate in an unlimited manner when a torque which exceeds a threshold level is applied. In contrast to the prior art overload clutches, the running wheel 20 according to the invention, like a torque rod, has only a limited rotatability. The connection which transmits torque between a wear-resistant running ring 2 and a resilient damped hub 4 is tight-fitting and thereby free of play and can be effected by a positive and/or frictional engagement.

Because the hub 4 is partially constructed from plastic, which has elastic characteristics, torque peaks are intercepted by the hub 4 almost in their entirety and are not directed into the gear unit. When the running wheel 20 is overloaded, the hub 4 acts additionally as a safety, by preventing destruction of the gear unit. The hub 4 represents the weakest link in the torque transmission chain and therefore will be the first to yield and be plastically deformed during overloading. Instead of plastic, the hub 4 can also be formed, with respect to material, at least partially from a resilient light metal alloy.

Figure 3:
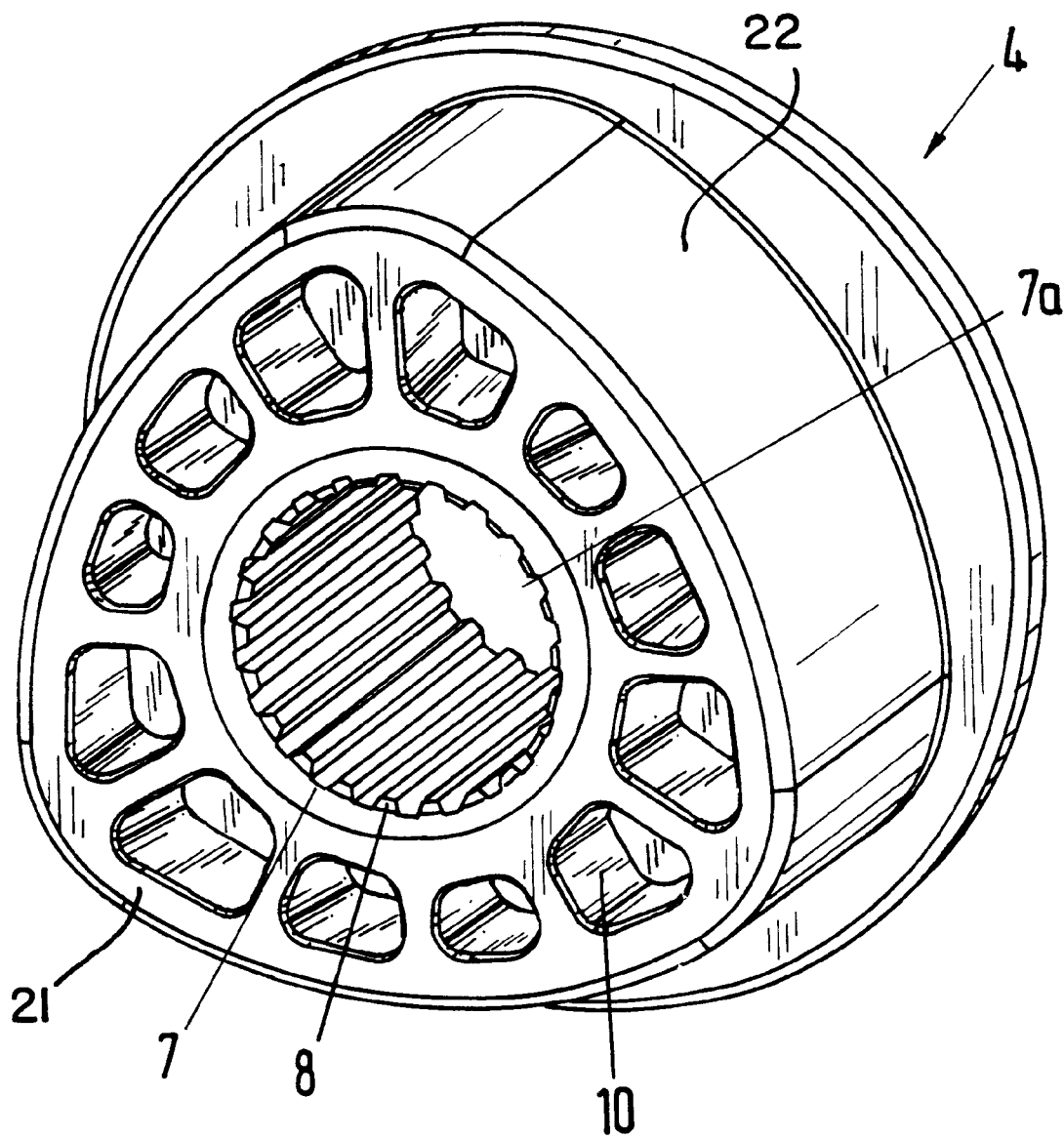
FIG. 3 is a perspective view of a hub of the running wheel shown in FIG. 1.
Figure 4:
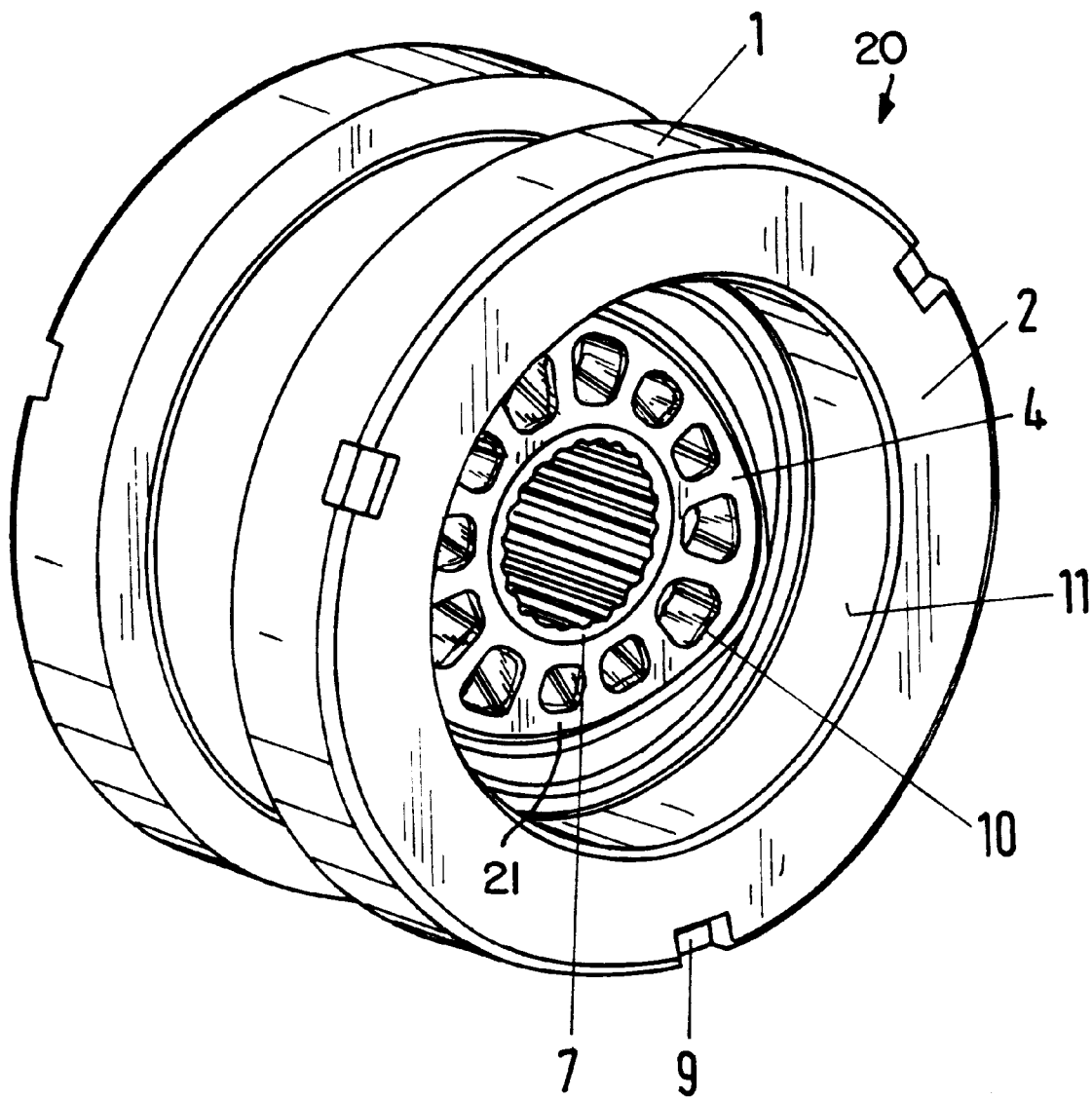
FIG. 4 is a perspective view of the running wheel of FIG. 1.

As shown in FIG. 3, an outer surface 22 of the hub 4 is shaped like an equilateral spherical triangle. To achieve a positive engagement without play between the outer surface 22 and the central opening 3, the central opening 3 of the running ring 2 has a corresponding cross section so that the outer surface 22 fits tightly against the central opening 3. Referring also to FIG. 4, the running ring 2 includes recesses 9 on both sides. The recesses 9 are spaced at equal angles from one another along the outer circumference of the running wheel 2. These recesses 9 are indicators of wheel flange wear in the running ring 2. The depth of the recesses 9, and accordingly the wear, is visible from the side and can be monitored in a simple manner. The running ring 2 is shown with an inserted hub 4 in a perspective view in FIG. 4.

Figure 5A:
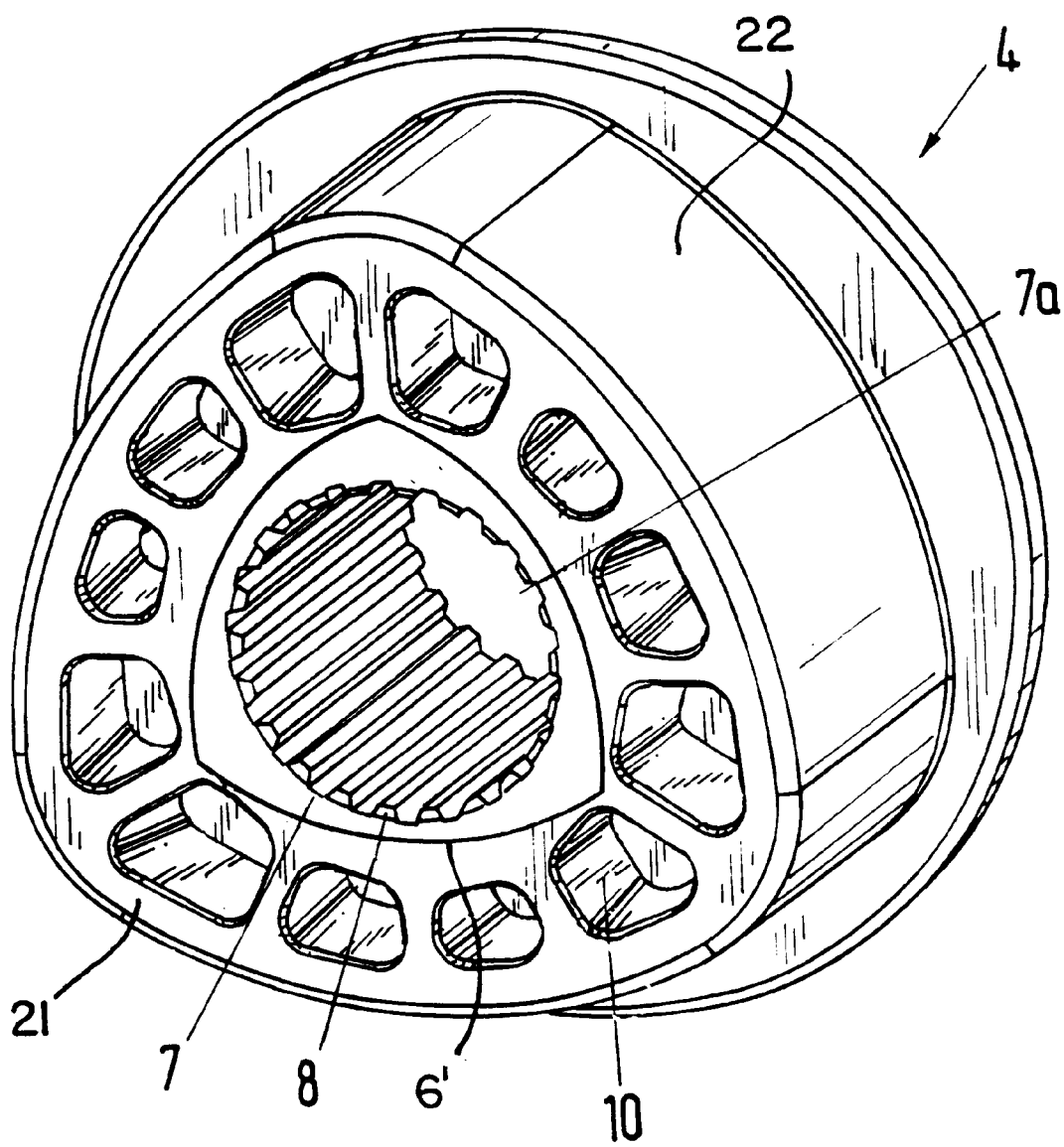
FIGS. 5a and 5b are perspective views of different embodiments of the running wheel of FIG. 1.
Figure 5B:
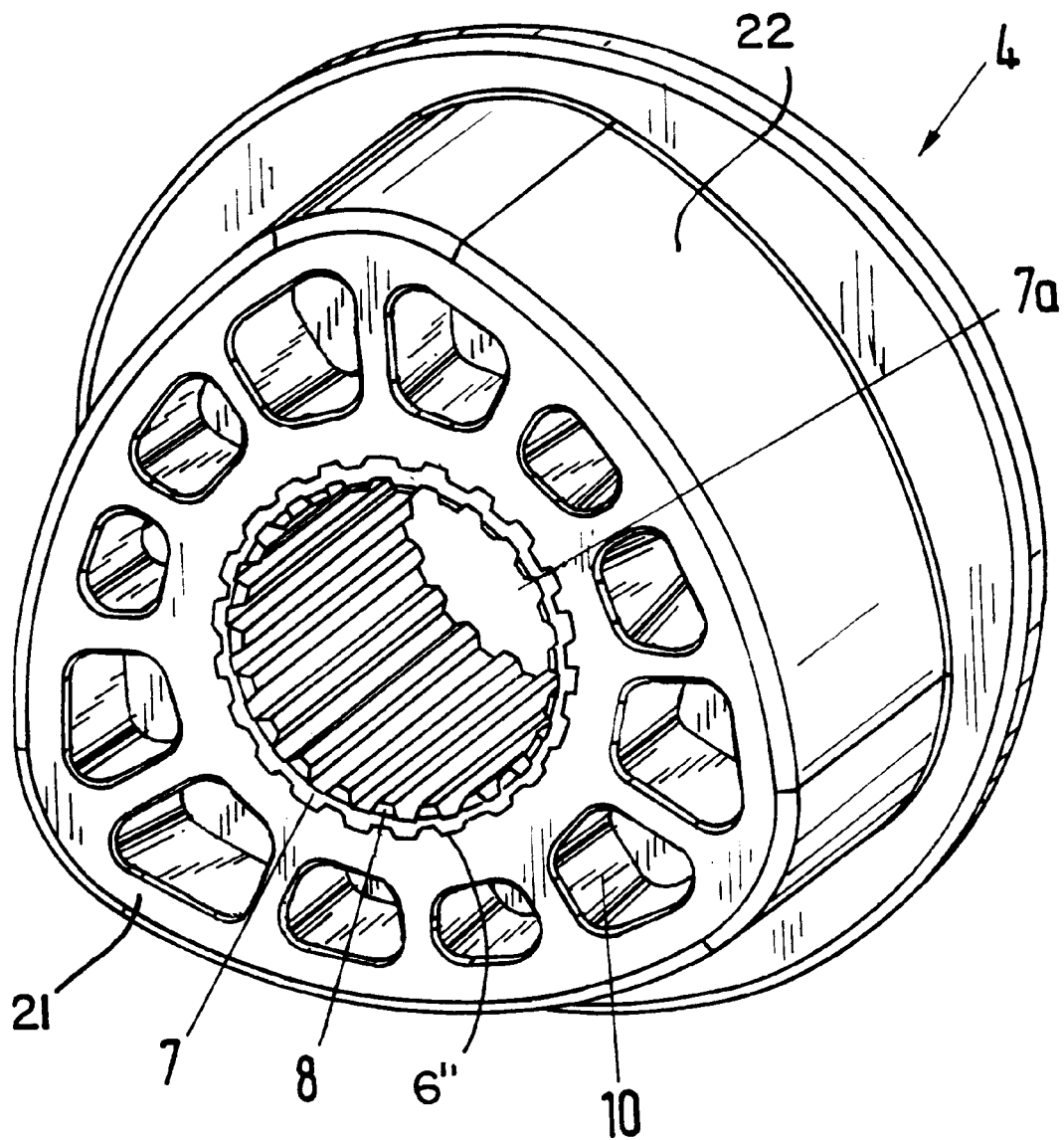

Departing from the embodiment example, instead of the through-opening 6 of the hub 4 being circular, an equilateral spherical triangle shape or a spline toothing as an inner cross section can also be used, as shown by the through-openings 6' and 6" in FIGS. 5a and 5b, respectively. The shaft of the drive shaft would include a corresponding outer cross section.

Further, instead of using metal and plastic, it is also possible to produce the hub 4 entirely from plastic when the torque and load demands on the running wheel 2 are lower.

To facilitate the injection molding process, the hub 4 has through-cavities 10 in addition as can be seen from the drawings. As can further be seen from FIGS. 2 and 4, two bearing ring surfaces 11 are mounted at both sides of the center plane 5 in the running ring 2 for receiving bearings.

The invention is not limited by the embodiments described above which are presented as examples only but can be modified in various ways within the scope of protection defined by the appended patent claims.

We claim:

1. A running wheel for a traveling unit that runs on rails, comprising:

a running ring having a central opening;

a resilient hub having an outer surface inserted in said central opening and being connectable with a drive shaft for transmitting a torque supplied by said drive shaft to said running ring;

a torque-transmitting connection between said outer surface of said resilient hub and said central opening of said running ring operatively preventing play between said outer surface of said resilient hub and said running ring, and said central opening of said running ring comprises an equilateral spherical triangle cross section, and said resilient hub comprises a shaft having a cross section corresponding to said equilateral spherical triangle cross section of said central opening, said shaft being insertable and fitting tightly within said central opening thereby preventing play between said outer surface of said resilient hub and said running rim.

2. The running wheel according to claim 1, wherein said running ring and said drive shaft are rotatable relative to one another within a defined angular area when acted upon by torque, responsive to an amount of elasticity of a material used to construct said resilient hub.

3. The running wheel according to claim 1, wherein said torque-transmitting connection between said outer surface of said hub and said running ring is formed by at least one of a positive engagement and a frictional engagement.

4. The running wheel according to claim 1, wherein said resilient hub comprises a resilient plastic.

5. The running wheel according to claim 4, wherein said resilient plastic is cast by an injection molding process.

6. The running wheel according to claim 4, wherein said outer surface of said hub includes an outer rim region which comprises said resilient plastic.

7. The running wheel according to claim 6, wherein said outer rim area of said hub comprises at least one third of a radius of said resilient hub.

8. The running wheel according to claim 1, wherein said resilient hub comprises a resilient light metal alloy.

9. The running wheel according to claim 1, wherein said hub comprises a centrally arranged through-opening in which a correspondingly shaped shaft end of said drive shaft fits in at least one of a positive engagement and a frictional engagement.

10. The running wheel according to claim 9, wherein said through-opening comprises one of an equilateral spherical triangular cross section and a spline toothing cross section.

11. The running wheel according to claim 9, wherein said resilient hub further comprises a metal ring inserted into said through-opening and said shaft end of said drive shaft fits into said metal ring.

12. The running wheel according to claim 1, wherein said running ring comprises one of wear-resistant cast iron and steel.

13. The running wheel according to claim 1, wherein said running ring further comprises:

an outer rolling surface which contacts a surface on which said running wheel rolls; and at least one recess on both sides of said running ring which join the outer rolling surface, a size of said at least one recess indicating wear of said running ring.

* * * * *